US012724624B2

(12) United States Patent
Bhagat et al.

(10) Patent No.: US 12,724,624 B2
(45) Date of Patent: Sep. 1, 2026

(54) GENERATING EXECUTABLE TASKS FROM NON-EXECUTABLE TEXT FILES

(71) Applicant: Dell Products L.P., Hopkinton, MA (US)

(72) Inventors: Kartike Bhagat, Framingham, MA (US); Manish Dwivedi, Hopkinton, MA (US); Aaron Twohig, Swinford (IE); Lisa O'Mahony, Glanmire (IE); Francisco Jaen, Cork (IE)

(73) Assignee: Dell Products L.P., Hopkinton, MA (US)

( * ) Notice: Subject to any disclaimer, the term of this patent is extended or adjusted under 35 U.S.C. 154(b) by 393 days.

(21) Appl. No.: 18/461,547

(22) Filed: Sep. 6, 2023

(65) Prior Publication Data

US 2025/0077241 A1 Mar. 6, 2025

(51) Int. Cl.
*G06F 9/445* (2018.01)
*G06F 21/45* (2013.01)

(52) U.S. Cl.
CPC .......... *G06F 9/44526* (2013.01); *G06F 21/45* (2013.01)

(58) Field of Classification Search
CPC ............................ G06F 9/44526; G06F 21/45
USPC ......................................................... 718/104
See application file for complete search history.

(56) References Cited

U.S. PATENT DOCUMENTS

| | | | | |
|---|---|---|---|---|
| 6,453,464 | B1 * | 9/2002 | Sullivan | G06F 8/51 717/136 |
| 7,076,763 | B1 * | 7/2006 | DeGroote | G06F 8/20 717/113 |
| 8,443,375 | B2 * | 5/2013 | Rodrigues | G06F 9/544 719/314 |
| 9,300,660 | B1 * | 3/2016 | Borowiec | H04L 63/08 |
| 9,864,517 | B2 * | 1/2018 | Labiaga | G06F 9/5027 |
| 10,346,550 | B1 * | 7/2019 | Botta | G06F 16/2228 |
| 10,572,576 | B1 * | 2/2020 | Marc-Aurele | G06F 40/279 |
| 12,026,740 | B1 * | 7/2024 | Canney | G06F 16/958 |
| 12,147,758 | B1 * | 11/2024 | Thomas | G06F 40/18 |
| 2002/0073091 | A1 * | 6/2002 | Jain | G06F 9/465 707/E17.118 |

(Continued)

OTHER PUBLICATIONS

Janoky, Laszlo et al. "An analysis on the revoking mechanisms for JSON Web Tokens". International Journal of Distributed Sensor Networks. Next Generation Internet of Things (IoT) and Cloud Security Solutions—Research Article. vol. 14(9). (Year: 2018).*

*Primary Examiner* — Adam Lee
(74) *Attorney, Agent, or Firm* — Anderson Gorecki LLP

(57) ABSTRACT

A multi-site data storage monitoring system communicates executable actions to remote element managers in non-executable text files. Each non-executable text file includes a human-readable textual description of the action, a top-level Java class of a known task type, and essential properties. The element managers generate executable jobs from the non-executable text files by instantiating an empty task object based on the top-level Java class, partially populating the empty task object based on the essential properties, adding the partially populated task object to a job structure, and using a token to provide authorization at job run-time. The token is created using user authentication information provided in response to presentation of the human-readable textual description of the action.

20 Claims, 5 Drawing Sheets

(56) References Cited

U.S. PATENT DOCUMENTS

2004/0078780 A1* 4/2004 Dutt .................... G06F 8/456 717/130
2004/0216146 A1* 10/2004 Sanchez, II ............ G06F 9/449 717/165
2004/0243772 A1* 12/2004 Wissenbach .......... G06F 3/0611 711/170
2006/0085790 A1* 4/2006 Hintermeister ......... G06F 9/451 718/100
2006/0242286 A1* 10/2006 Hawkins ............. G06F 11/0709 714/E11.173
2007/0180509 A1* 8/2007 Swartz .................. G06F 21/575 726/9
2008/0148270 A1* 6/2008 Gopisetty ............. G06F 3/0605 718/104
2009/0138898 A1* 5/2009 Grechanik ................ G06F 8/20 719/328
2010/0005249 A1* 1/2010 Bates .................. G06F 11/3624 711/E12.001
2010/0114976 A1* 5/2010 Castellanos ........... G06F 16/283 707/E17.017
2011/0219146 A1* 9/2011 Jacobson ............ G06F 9/44505 710/16
2013/0124557 A1* 5/2013 Goode ............... G06F 16/2455 707/769
2014/0006391 A1* 1/2014 Friedlander ......... G06F 16/7844 707/723
2014/0092990 A1* 4/2014 Vuskovic ......... H04N 21/85403 375/240.26
2014/0188926 A1* 7/2014 Chandel ................ G06F 16/435 707/767
2014/0325149 A1* 10/2014 Misra .................... G06F 3/0619 711/114
2015/0363464 A1* 12/2015 Alves .................... G06F 16/903 707/765
2016/0350392 A1* 12/2016 Rice .................... G06F 16/2282
2017/0193031 A1* 7/2017 Papapanagiotou .......................... H04L 63/0428
2017/0235512 A1* 8/2017 Ruchita ................. G06F 3/0632 711/170
2018/0060098 A1* 3/2018 Atia ...................... G06F 3/0665
2019/0068568 A1* 2/2019 Liderman ............. H04L 9/3263
2019/0182115 A1* 6/2019 Wilshinsky ......... H04L 41/5032
2019/0220207 A1* 7/2019 Lingarajappa ...... G06F 11/1088
2019/0294657 A1* 9/2019 Singh ................... G06F 40/221
2019/0324666 A1* 10/2019 Kusters ................. G06F 3/0619
2020/0026637 A1* 1/2020 Sedlacek .............. G06F 9/4552
2020/0044911 A1* 2/2020 Kliger ..................... H04L 41/28
2020/0045075 A1* 2/2020 Kliger ..................... G06F 21/52
2020/0050382 A1* 2/2020 Dain ..................... G06F 3/0653
2020/0073639 A1* 3/2020 Prasad ...................... G06F 8/10
2021/0089969 A1* 3/2021 Sengupta ............ G06F 3/04817
2021/0306233 A1* 9/2021 Keller ...................... G06N 5/04
2021/0374058 A1* 12/2021 Chandrasekaran ..... G06F 21/45
2022/0005016 A1* 1/2022 Wu ........................ G06N 20/20
2022/0091766 A1* 3/2022 Vanninen ................ G06F 3/067
2022/0100625 A1* 3/2022 McCrory ............... G06N 20/00
2022/0188006 A1* 6/2022 Suzuki .................. G06F 3/0659
2022/0217097 A1* 7/2022 Weissblat .............. H04L 47/781
2022/0222207 A1* 7/2022 Kaneko ............... H04L 67/1097
2022/0229640 A1* 7/2022 Bryan ....................... G06F 8/35
2022/0309416 A1* 9/2022 Barday ................ G06Q 10/067
2022/0321568 A1* 10/2022 Shivanna ............. G06Q 30/018
2022/0350966 A1* 11/2022 Thomas ................ G06F 40/253
2022/0385672 A1* 12/2022 Lamberts ............ H04L 63/0428
2023/0035197 A1* 2/2023 Schepis ................... H04L 41/12
2023/0043751 A1* 2/2023 Nizam .................. G06F 30/327
2024/0004908 A1* 1/2024 Tran .................... G06F 16/9535
2024/0036965 A1* 2/2024 Habel ................. G06F 11/3034
2024/0348726 A1* 10/2024 Duggal ............... H04M 3/5183
2024/0378396 A1* 11/2024 Bhupati ................ G06F 16/335
2024/0419465 A1* 12/2024 Riscutia ................ G06F 40/166
2025/0292769 A1* 9/2025 Liu ........................ G10L 15/22

* cited by examiner

Figure 3:
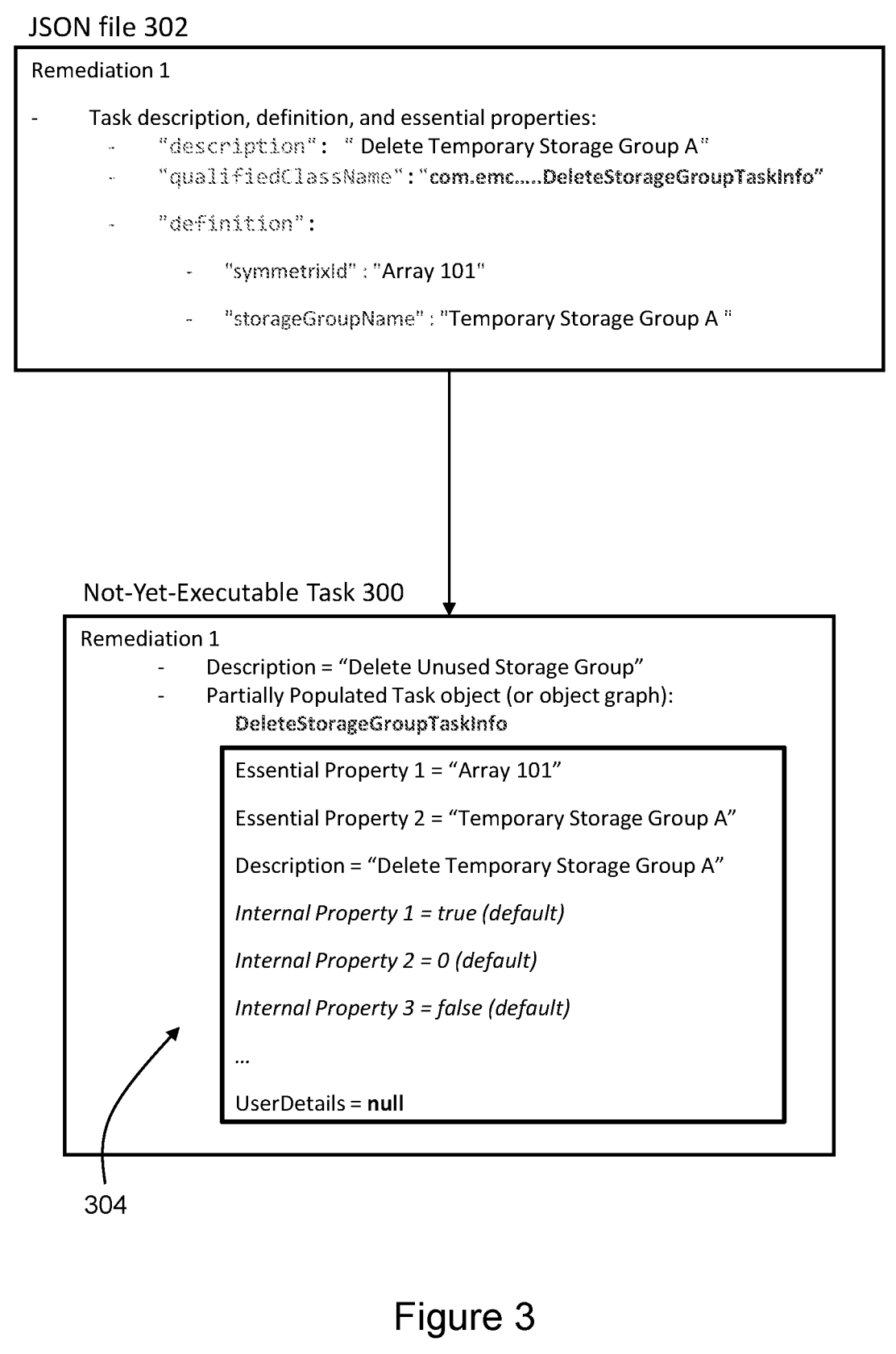

JSON file 302

Remediation 1

- Task description, definition, and essential properties:
  - "description": " Delete Temporary Storage Group A"
  - "qualifiedClassName": "com.emc.....DeleteStorageGroupTaskInfo"
  - "definition":
    - "symmetrixId" : "Array 101"
    - "storageGroupName" : "Temporary Storage Group A "

Not-Yet-Executable Task 300

Remediation 1
- Description = "Delete Unused Storage Group"
- Partially Populated Task object (or object graph): DeleteStorageGroupTaskInfo

Essential Property 1 = "Array 101"

Essential Property 2 = "Temporary Storage Group A"

Description = "Delete Temporary Storage Group A"

*Internal Property 1 = true (default)*

*Internal Property 2 = 0 (default)*

*Internal Property 3 = false (default)*

...

UserDetails = null

GENERATING EXECUTABLE TASKS FROM NON-EXECUTABLE TEXT FILES

TECHNICAL FIELD

The subject matter of this disclosure is generally related to remote management of data storage systems.

BACKGROUND

A cloud-based, multi-site data storage monitoring system can be configured to monitor remote Storage Area Networks (SANs), Network-Attached Storage (NAS) and a variety of other data storage nodes deployed in multiple data centers associated with different organizations. Performance, configuration, workload, and other information may be monitored, analyzed, and used to calculate recommended actions to maintain expected levels of performance, data protection, data availability, and security. The recommended actions are sent to storage administrators or other personnel as human-readable, non-executable descriptions. The administrative user manually implements recommended actions by generating and running various computer-executable tasks. For example, in response to a human-readable, non-executable recommendation to delete a temporary storage group a storage administrator might identify the storage objects associated with the temporary storage group, identify the storage nodes on which the storage objects and replicas thereof are maintained, and generate computer-executable commands to prompt deletion of the temporary storage group and associated storage objects.

SUMMARY

In accordance with some embodiments, a method comprises: monitoring operation of a plurality of data storage nodes and computing a recommended action for at least one of the data storage nodes; computing a non-executable textual representation of the recommended action; transmitting the non-executable textual recommendation to an element manager; the element manager using the non-executable textual recommendation to generate an executable job; and running the executable job to implement the recommended action.

In accordance with some embodiments, an apparatus comprises: a multi-site data storage monitoring system configured to monitor operation of data storage nodes, compute a recommended action for at least one of the data storage nodes, compute a non-executable textual representation of the recommended action, and transmit the non-executable textual recommendation; and an element manager configured to receive and use the non-executable textual recommendation to generate an executable job and prompt running of the executable job to implement the recommended action In accordance with some embodiments, a non-transitory computer-readable storage medium stores instructions that when executed by one or more computers cause the computers to perform a method comprising: monitoring operation of a plurality of data storage nodes and computing a recommended action for at least one of the data storage nodes; computing a non-executable textual representation of the recommended action; transmitting the non-executable textual recommendation to an element manager; the element manager using the non-executable textual recommendation to generate an executable job; and running the executable job to implement the recommended action.

The summary does not limit the scope of the claims or the disclosure. All examples, embodiments, aspects, implementations, and features can be combined in any technically possible way and the method and process steps may be performed in any order.

BRIEF DESCRIPTION OF THE FIGURES

FIG. 3 illustrates a not-yet-executable task created from information in a non-executable JSON file.

Various features and advantages will become more apparent from the following detailed description of exemplary embodiments in conjunction with the drawings.

DETAILED DESCRIPTION

Some aspects, features, and implementations described herein may include computer devices, components, and computer-implemented steps or processes. It will be apparent to those of ordinary skill in the art that the computer-implemented steps or processes may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, process, or element is necessarily described herein as part of a computer system. Those of ordinary skill in the art will recognize steps, processes, and elements that may have a corresponding computer system or software component. Such computer systems and software components are therefore enabled by describing their corresponding steps, processes, or elements, and are within the scope of the disclosure.

The terminology used in this disclosure is intended to be interpreted broadly within the limits of subject matter eligibility. The terms “logical” and “virtual” are used to refer to features that are abstractions of other features, e.g., and without limitation abstractions of tangible features. The term “physical” is used to refer to tangible features that possibly include, but are not limited to, electronic hardware. For example, multiple virtual computers could operate simultaneously on one physical computer. The term “logic” is used to refer to special purpose physical circuit elements, firmware, software, computer instructions that are stored on a non-transitory computer-readable medium and implemented by multi-purpose tangible processors, and any combinations thereof.

Figure 1:
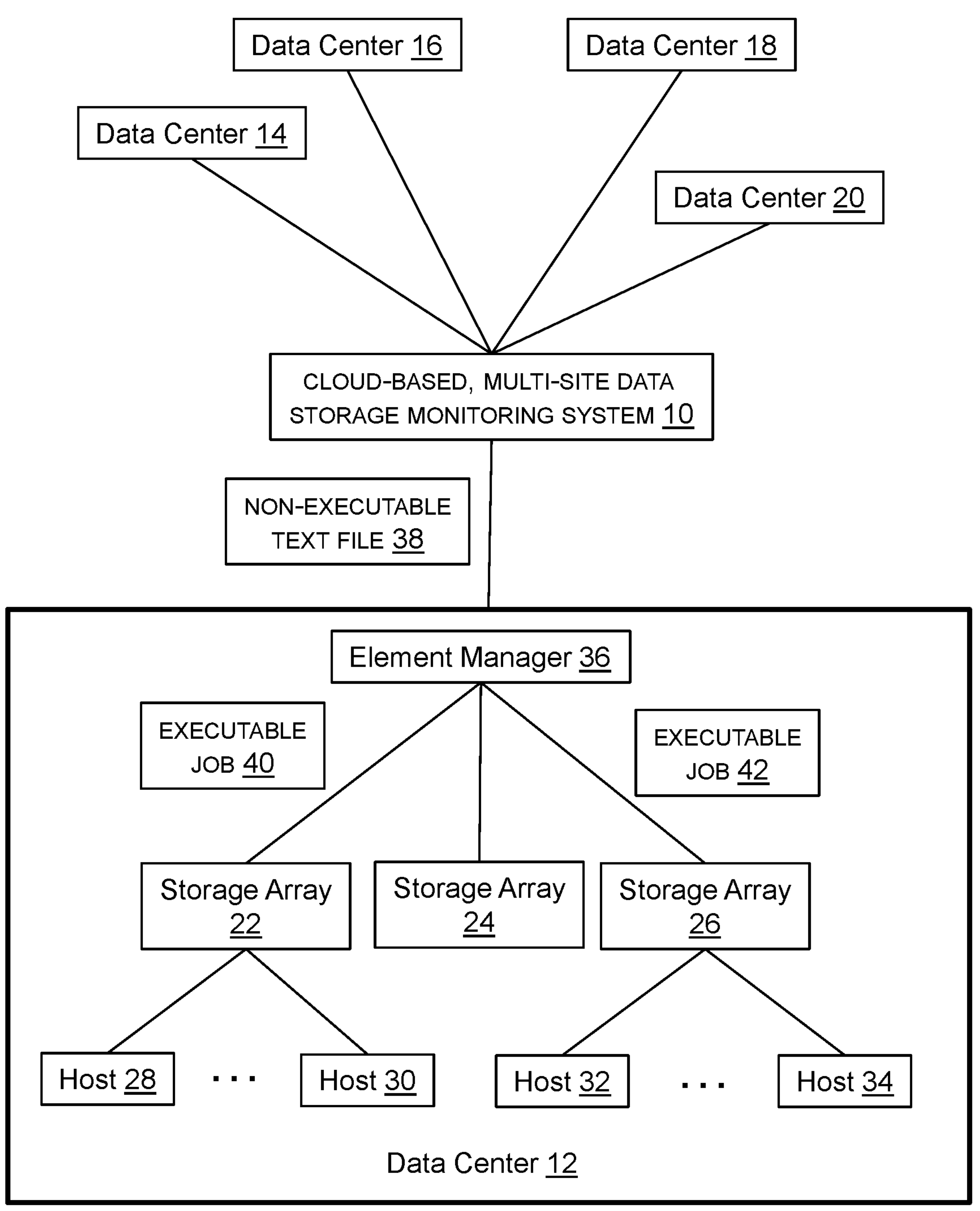
FIG. 1 illustrates a cloud-based, multi-site data storage monitoring system that generates non-executable text files describing recommended actions in a manner that enables element managers to automate generation of associated executable tasks and jobs at least partially.

FIG. 1 illustrates a cloud-based, multi-site data storage monitoring system 10 that generates non-executable text files describing recommended actions in a manner that enables element managers to automate generation of associated computer-executable jobs at least partially. Monitoring system 10 collects performance, configuration, workload, and other information from data centers 12, 14, 16, 18, 20. More specifically, the monitoring system collects information about performance, configuration, and workload of each storage node in each data center. In the illustrated example, data center 12 includes storage arrays 22, 24, 26 and clusters of host servers 28-30, 32-34. The host servers 22 are tangible server computers with volatile memory, persistent storage, and multi-core processors. Each host server may support virtual machines or containers for simultaneously running multiple instances of host applications that support organizational processes, e.g., accounting, inventory control, sales, email, etc. The storage arrays maintain the data used by those applications. Each data center includes at least one element manager. Element manager 36 includes a computing device or terminal for accepting input commands from an administrative user and presenting information about operation of the storage arrays and host servers to the administrative user. Further, the element manager is adapted to generate executable jobs 40, 42 to implement recommended actions described in non-executable text file 38 provided by the monitoring system 10. Implementation of the recommended actions may be contingent upon authorization from the administrator but otherwise be automated, so time-consuming and error prone manual management processes are mitigated.

Figure 2:
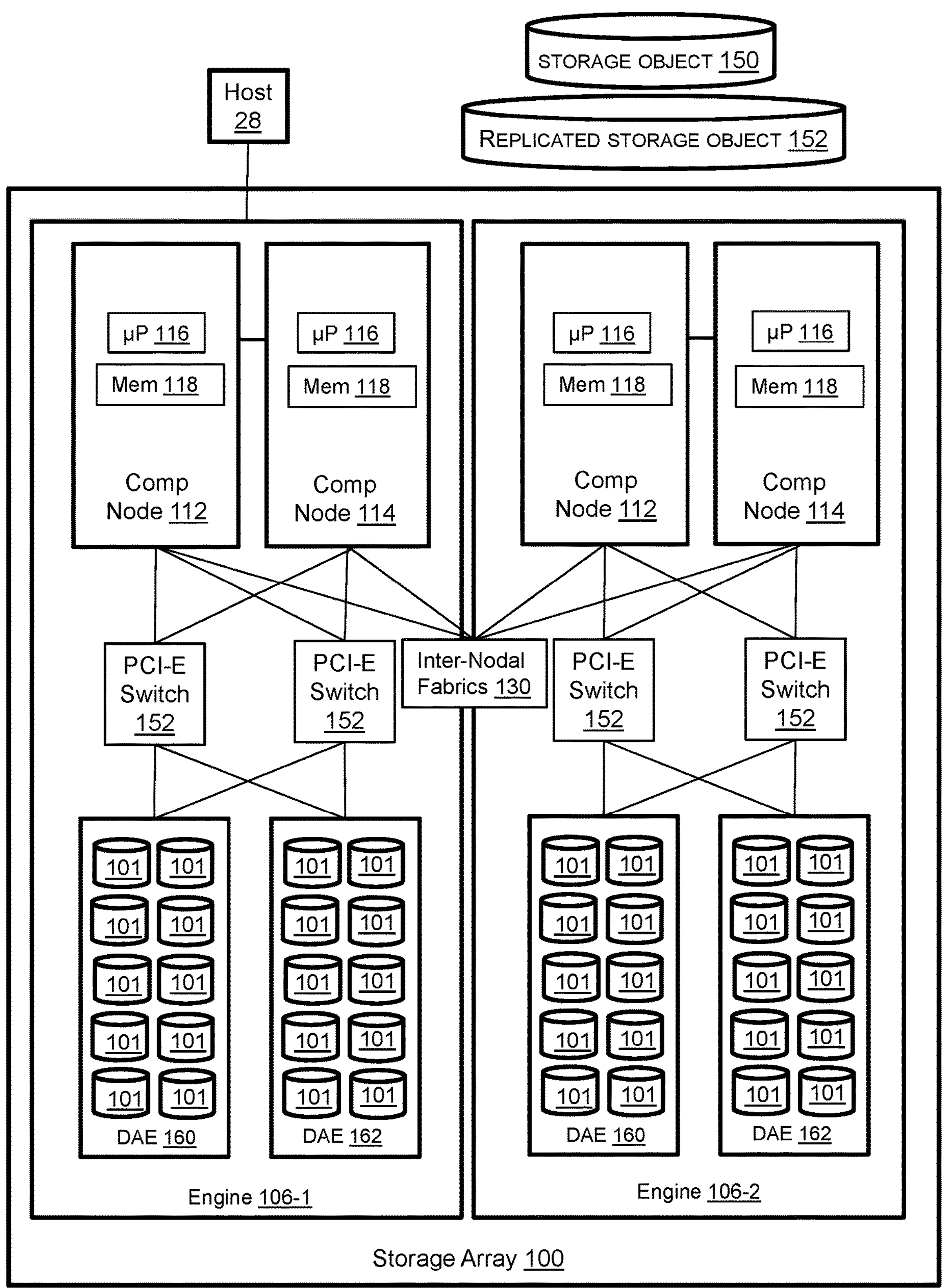
FIG. 2 illustrates a storage array in greater detail.

FIG. 2 illustrates a storage array 100 in greater detail. The storage array is shown with two engines 106-1, 106-2, but might include any number of engines. Each engine includes disk array enclosures (DAEs) 160, 162 and a pair of peripheral component interconnect express (PCI-e) interconnected compute nodes 112, 114 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. The processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with SaaS system servers for servicing IOs. Each compute node also includes one or more adapters for communicating with other compute nodes via redundant inter-nodal channel-based InfiniBand fabrics 130.

Data that is created and used by instances of the applications running on the host servers is maintained on the managed drives 101. The managed drives are not discoverable by the host servers, so the storage array creates logical production storage objects 150, 152 that can be discovered and accessed by those servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers, each production storage object is a single disk drive having a set of contiguous fixed-size logical block addresses (LBAs) on which data used by the instances of one of the host applications resides. However, the host application data is stored at non-contiguous addresses on various managed drives 101. Replicated storage object 152 is replicated by a remote storage array, either synchronously or asynchronously.

FIG. 3 illustrates a not-yet-executable task 300 created from information in a JSON file 302, which is an example of a non-executable text file. The JSON file 302 represents a recommended action, "remediation 1", which is generated by the monitoring system and sent to an element manager. Included in the JSON file is a human-readable textual description ("Delete Temporary Storage Group A") that is generated by the monitoring system to convey the intention and essential properties of the recommended action to the administrative user. A metadata hint ("qualifiedClassName") identifies a top-level Java class of a known task type associated with the recommended action. Only the top-level class name is required to instantiate a corresponding task. The types of other objects in the task object graph are automatically computed by the element manager. Essential properties ("definition") are also included in the JSON file 302.

In response to receipt of the JSON file 302, the element manager constructs an initially empty Java task object 304 of the supported type associated with the metadata hint and partially populates that task object using the essential properties from the JSON file. Unspecified internal properties are placed or remain in a default state. In contrast, existing metadata solutions usually insert metadata for the entire object graph in a recursive fashion. To reduce coupling between the element manager and monitoring system, only the metadata for the top node of the object graph is required. To avoid problems with partially or badly generated descriptions, default descriptions are overridden with values provided in the JSON file. Authorization credentials of the administrative user, "UserDetails," are not yet added to the task object. The java task object 304 is not yet executable but includes sufficient content to be presented to the administrative user for approval.

Figure 4:
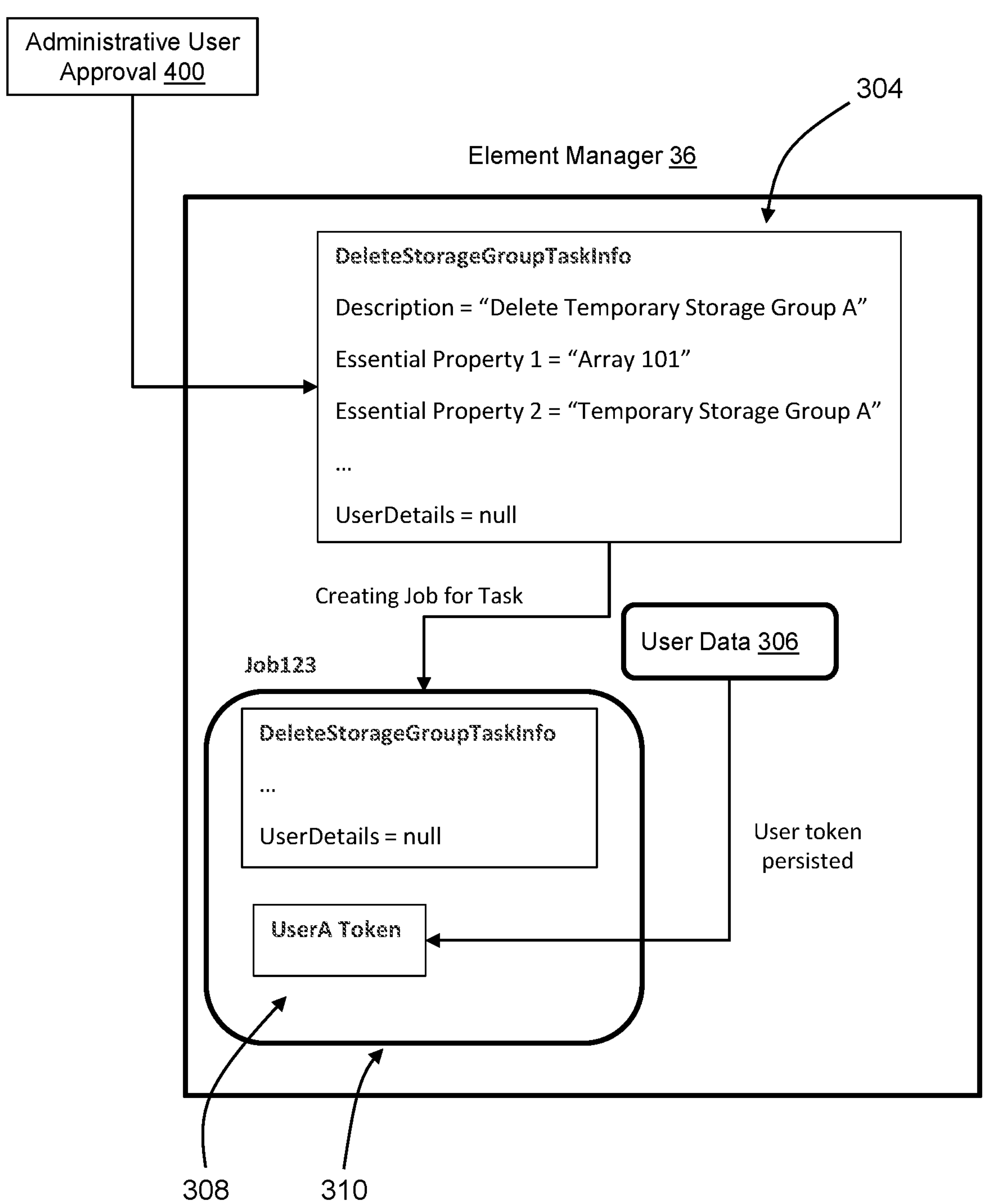
FIG. 4 illustrates creation of an executable job from the not-yet executable task.

FIG. 4 illustrates creation of an executable job from the not-yet executable task. Using element manager 36, the administrative user reviews the human-readable textual description and chooses to implement the recommended action by providing an approval 400. The approval 400 includes user data 306 with the authorization credentials (UserDetails) of the administrative user. For security purposes, element manager 36 is configured to only execute tasks that have been approved by an authorized administrative user as indicated by the presence of valid authorization credentials. The administrative user may specify immediate execution of the task or execution at a future date and/or time. The administrative user's authorization credentials are stored via token 308. Task object 304 is placed in a "Job" structure 310 which is used to for task execution/scheduling. The element manager populates the Job structure with UserDetails at execution time. This is achieved by retrieving the correct user via the stored token 308. Such late insertion of the UserDetails for the purposes of authorization is advantageous. Previously, user information was populated when the logged-in user created a task via the GUI, so the user had to be logged-in for the recommendation to be implemented. Late insertion of user information enables tasks to be performed at dates and times when the administrative user is not logged-in.

Figure 5:
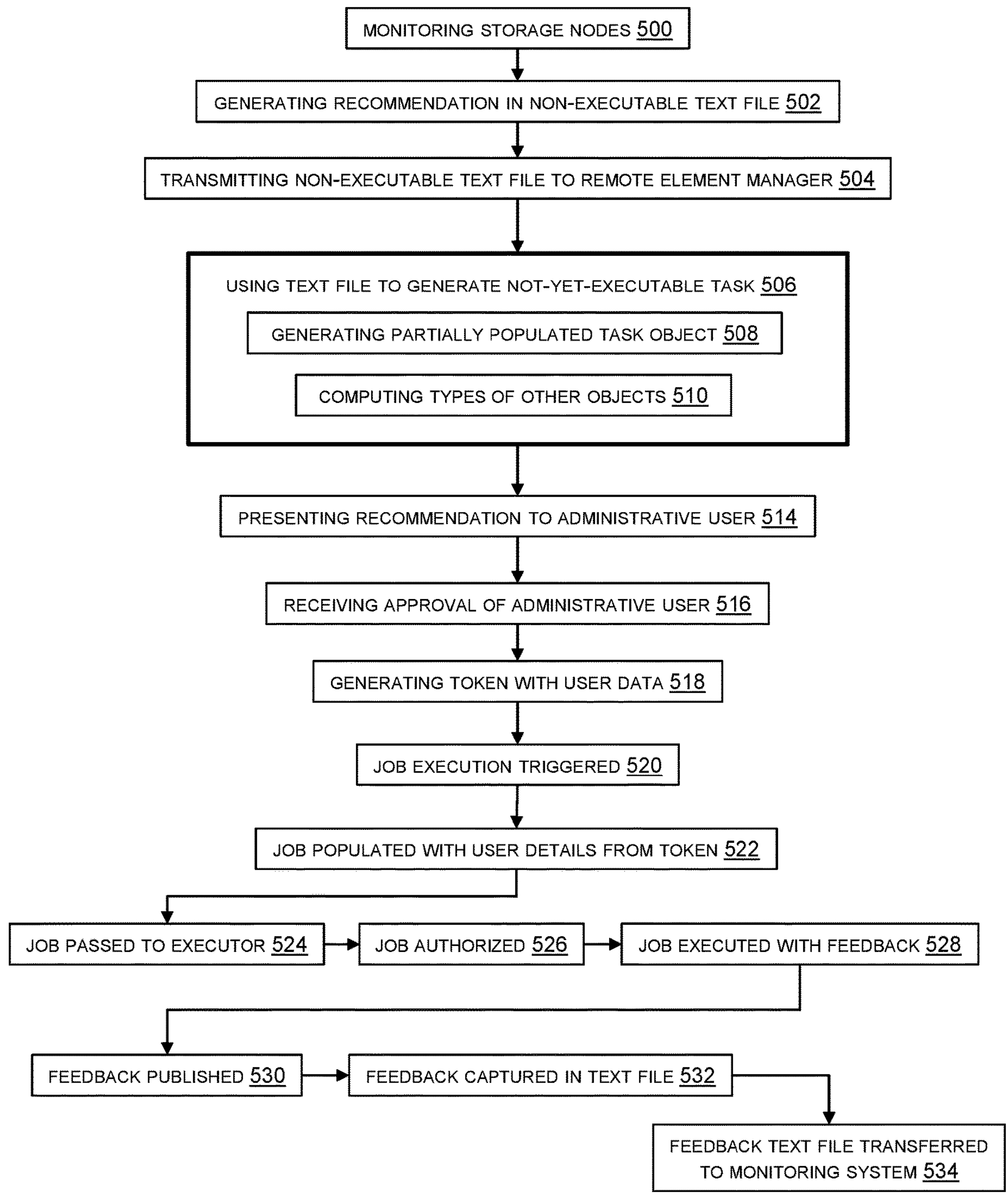
FIG. 5 illustrates a process for partial automation of job and task generation based on a recommended action described in a non-executable JSON file.

FIG. 5 illustrates a process for partial automation of task and job generation based on a recommended action described in a non-executable JSON file. The cloud-based, multi-site data storage monitoring system collects information about performance, configuration, and workload of each storage node in each data center as indicated in step 500. Step 502 is analyzing the collected information and generating a non-executable text file that contains a recommended action. The text file, which may be a JSON file, includes a human-readable textual description of the recommended action and identifies a top-level Java class of a known task type associated with the recommended action. The text file may also include essential properties. Step 504 is transmitting the non-executable text file from the monitoring system to the element manager. Step 506 is using the non-executable text file to generate a not-yet-executable task. This includes generating a partially populated task object in step 508 and computing types of other objects needed in step 510. The top-level java class from the non-executable text file is used to generate the partially populated task object and compute the types of other objects. The task object is added to a Job structure. Step 514 is presenting the recommendation to an administrative user using the human-readable textual description. Step 516 is receiving approval from the administrative user. Step 518 is generating a token with the authentication credentials of the administrative user. Step 520 is triggering job execution at the time and date specified by the administrative user, which may be immediate, i.e., the current date and time. In step 522 the Job is populated with authentication credentials from the token. In step 524 the Job is passed to the executor. The Job is authorized using the authentication credentials in step 526. In step 528 the Job is executed, and feedback is generated. The feedback indicates whether the Job was successfully run. The feedback is published in step 530 and captured in a text file such as a JSON file in step 532. In step 534 the feedback text file is sent to the monitoring system. This feedback can confirm operation success, return results, e.g., the names of storage objects created, or give details of errors, warnings, or failure. The feedback can be used to refine the recommendation-generation logic.

At least some embodiments include advantages such as delayed execution, which may occur at a specified time when the administrative user is not logged-in. Further, the administrative user is not required to identify various storage objects associated with a recommendation and then issue commands to implement the recommendation. Rather, an executable task object and Job may be automatically generated such that the administrative user need only input authorization credentials. Further, the process can be implemented without the need for a new API and shared model because existing text-based communications can be used. Consequently, client applications running on the element managers do not necessarily need to all be of the same version.

A number of features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. A method comprising:

transmitting, from a first computer to an element manager computer, a non-executable textual representation of a recommended action to reconfigure a first data storage node of a plurality of data storage nodes by deleting an identified storage group on the first data storage node;

the element manager computer using the non-executable textual representation of the recommended action to generate a computer-executable job to implement the recommended action; and executing, by the element manager computer, the computer-executable job to delete the identified storage group on the first data storage node, wherein:

the non-executable textual representation of the recommended action is a Javascript Object Notation (JSON) file including an intention and essential properties of the recommended action, and the element manager computer retrieves stored authorization credentials for a user of the first computer via a token when the user is not logged in to the first computer at execution time of the executing the computer-executable job by the element manager computer.

2. The method of claim 1 further comprising the first computer transmitting a human-readable textual description of the recommended action as part of the non-executable textual representation.

3. The method of claim 2 further comprising the first computer transmitting a top-level Java class associated with the recommended action as part of the non-executable textual representation.

4. The method of claim 3 further comprising the first computer transmitting the essential properties of the recommended action as part of the non-executable textual representation.

5. The method of claim 4 further comprising the element manager computer instantiating an empty task object based on the top-level Java class and partially populating the empty task object based on the essential properties to create a partially populated task object.

6. The method of claim 5 further comprising the element manager computer presenting the human-readable textual description of the recommended action.

7. The method of claim 6 further comprising the element manager computer generating the executable job by adding the partially populated task object to a job structure and using the token to provide authorization to implement the recommended action.

8. An apparatus comprising:

a multi-site data storage monitoring system comprising a first computer configured to transmit a non-executable textual representation of a recommended action to reconfigure a first data storage node of a plurality of data storage nodes by deleting an identified storage group on the first data storage node; and an element manager computer configured to:

receive the non-executable textual representation of the recommended action from the first computer;

use the non-executable textual representation to generate a computer-executable job to implement the recommended action; and execute the computer-executable job to delete the identified storage group on the first data storage node, wherein:

the non-executable textual representation of the recommended action is a JavaScript Object Notation (JSON) file including an intention and essential properties of the recommended action, and the element manager computer is further configured to retrieve stored authorization credentials for a user of the first computer via a token when the user is not logged in to the first computer at execution time of the executing the computer-executable job by the element manager computer.

9. The apparatus of claim 8 further comprising the monitoring system computer configured to transmit a human-readable textual description of the recommended action as part of the non-executable textual representation.

10. The apparatus of claim 9 further comprising the monitoring system computer configured to transmit a top-level Java class associated with the recommended action as part of the non-executable textual representation.

11. The apparatus of claim 10 further comprising the monitoring system computer configured to transmit the essential properties of the recommended action as part of the non-executable textual representation.

12. The apparatus of claim 11 further comprising the element manager computer configured to instantiate an empty task object based on the top-level Java class and partially populate the empty task object based on the essential properties to create a partially populated task object.

13. The apparatus of claim 12 further comprising the element manager computer configured to present the human-readable textual description of the recommended action.

14. The apparatus of claim 13 further comprising the element manager computer configured to generate the executable job by adding the partially populated task object to a job structure and using the token to provide authorization to implement the recommended action.

15. A non-transitory computer-readable storage medium storing instructions that when executed by one or more computers cause the computers to perform a method comprising:

transmitting, from a first computer to an element manager computer, a non-executable textual representation of a recommended action to reconfigure a first data storage node of a plurality of data storage nodes by deleting an identified storage group on the first data storage node;

the element manager computer using the non-executable textual representation of the recommended action to generate a computer-executable job to implement the recommended action; and executing, by the element manager computer, the computer-executable job to delete the identified storage group on the first data storage node, wherein:

the non-executable textual representation of the recommended action is a Javascript Object Notation (JSON) file including an intention and essential properties of the recommended action, and the element manager computer retrieves stored authorization credentials for a user of the first computer via a token when the user is not logged in to the first computer at execution time of the executing the computer-executable job by the element manager computer.

16. The non-transitory computer-readable storage medium of claim 15 in which the method further comprises transmitting a human-readable textual description of the recommended action as part of the non-executable textual representation.

17. The non-transitory computer-readable storage medium of claim 16 in which the method further comprises transmitting a top-level Java class associated with the recommended action as part of the non-executable textual representation.

18. The non-transitory computer-readable storage medium of claim 17 in which the method further comprises transmitting the essential properties of the recommended action as part of the non-executable textual representation.

19. The non-transitory computer-readable storage medium of claim 18 in which the method further comprises the element manager computer instantiating an empty task object based on the top-level Java class and partially populating the empty task object based on the essential properties to create a partially populated task object.

20. The non-transitory computer-readable storage medium of claim 19 in which the method further comprises generating the executable job by adding the partially populated task object to a job structure and using a token to provide authorization to implement the recommended action.

* * * * *